M. C. SCHWAB.
GRAVITY CONVEYER HAVING SPIRAL BLADE OF VARYING PITCH.
APPLICATION FILED APR. 23, 1908.
979,711.
Patented Dec. 27, 1910.
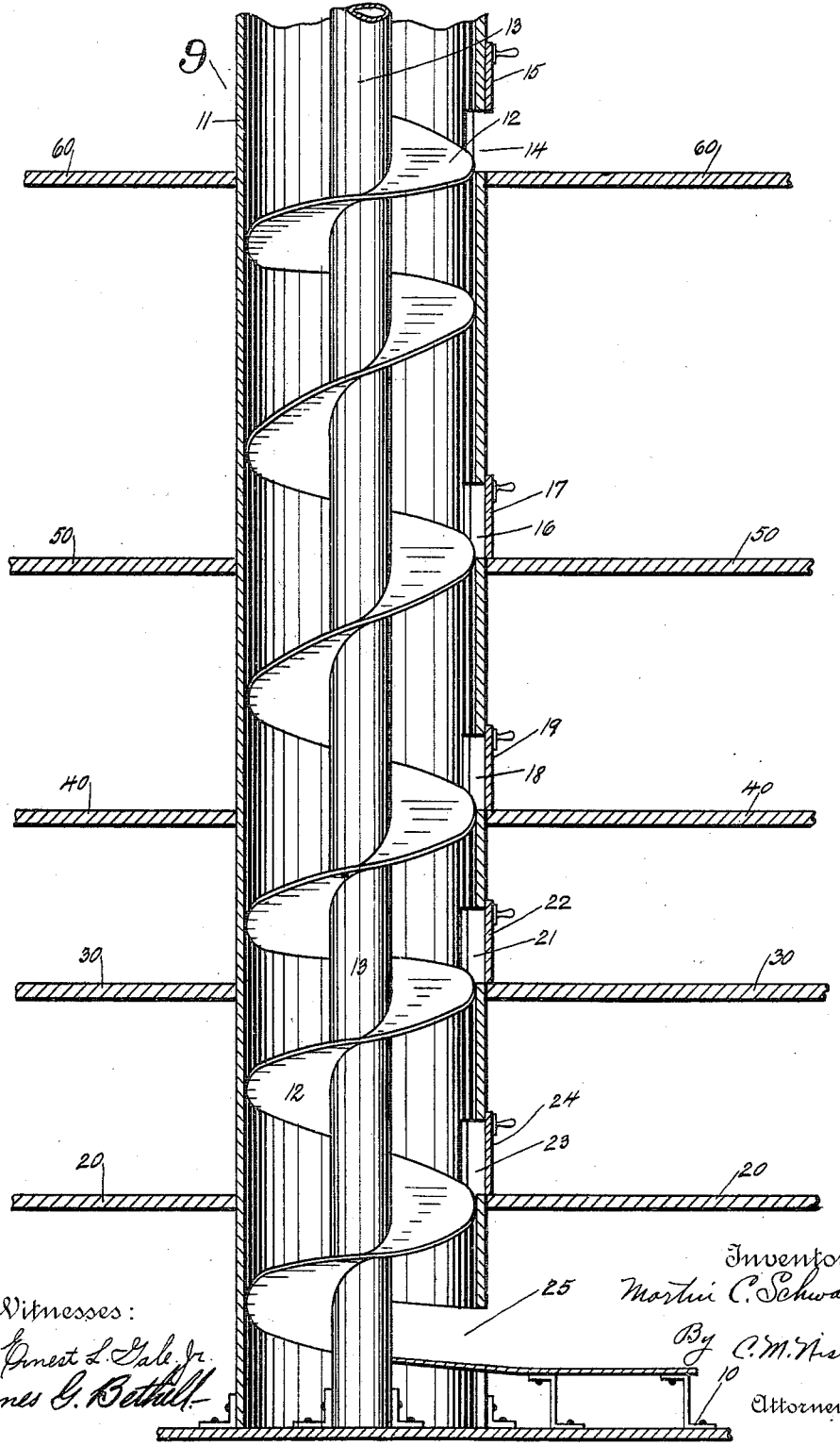

UNITED STATES PATENT OFFICE.

MARTIN C. SCHWAB, OF CHICAGO, ILLINOIS, ASSIGNOR TO GRAVITY CONVEYOR COMPANY, A CORPORATION OF NEW YORK.

GRAVITY-CONVEYER HAVING SPIRAL BLADE OF VARYING PITCH.

979,711. Specification of Letters Patent. Patented Dec. 27, 1910.

Application filed April 23, 1908. Serial No. 428,797.

*To all whom it may concern:*

Be it known that I, MARTIN C. SCHWAB, a citizen of the United States, residing at Chicago, in the county of Cook and State of Illinois, have invented a new and useful Improvement in Gravity - Conveyers Having Spiral Blades of Varying Pitch, of which the following is a specification.

My invention relates to improvements in gravity conveyers, and more particularly to spiral gravity conveyers; and one of the objects of my invention is the provision of a spiral conveying surface of varying pitch, so as to adapt it to a building having floors at different heights, in order that openings for the entrance and discharge of articles into or out of the conveyer may be provided at desirable locations.

A further object of my invention is to vary the pitch of a spiral conveying surface so that rapidly descending articles may be slowed down before being discharged from any desired conveyer openings.

Other objects will appear hereinafter, the novel combinations of elements being pointed out in the appended claims.

The accompanying drawing shows a front sectional elevation of a spiral gravity conveyer embodying my invention, and adapted to a building having varying floor heights.

Referring to the drawing, 9 designates the conveyer which comprises an outer shell or casing 11 and an inner central core 13, between which and supported thereby is a spiral conveying surface 12.

20, 30, 40, 50, and 60 designate floors arranged at various distances from each other, and 10 is the basement. Each floor may be provided with openings, such as 14, 16, 18, 21, 23 and 25, for the entrance or discharge of articles into or out of the conveyer 9, and each opening may be closed by a suitable door, as 15, 17, 19, 22 and 24, respectively. The various openings into the conveyer are herein shown as being adjacent each floor landing and in vertical alinement with each other, and, in order that the spiral surface 12 may be in proper relation to each opening, so as to facilitate the discharge of articles therefrom, it is evident that the pitch of the spiral surface will vary proportionately with the various floor heights. Where the spiral surface is made of a certain definite pitch throughout its length, the opening at any particular floor must be arranged in reference to the spiral, regardless of its position with respect to the floor. In such case the opening may come at a very undesirable and inaccessible place, and it is only by varying the pitch of the spiral to suit each individual installation that the openings at any and all floors may be accurately and desirably located.

It is often found desirable to vary the speed of descending articles in such manner that they will start easily and smoothly at slow speed, after which the speed may increase until, finally, just before the articles reach a particular discharge opening they are automatically retarded in their movement, and upon reaching the discharge opening will be carried out of the conveyer at a comparatively slow speed. This feature is of particular value where the articles being conveyed are of a fragile or delicate nature and are easily broken.

I accomplish the above by varying the pitch of the spiral, and in order to illustrate how this is done, reference being had to the drawing, we will assume that the spiral 12 is arranged as shown and it is desired to convey articles from the floor 60 to the floor 30. The spiral adjacent the floor 60 is of relatively low pitch, and after the same has made substantially a single turn the pitch increases and the spiral continues at this increased pitch for two turns, after which the spiral continues at a reduced pitch for substantially one more turn, or adjacent the floor 30. If any articles are placed onto the spiral conveyer surface at the opening 14, they will move slowly for substantially one turn of the spiral, after which they will rapidly increase in speed during their passage down that portion of the spiral where the pitch is increased, or for substantially two turns. At this point the pitch becomes less or not so steep, and the descending articles are gradually slowed down until finally they reach the opening 21 and are thrown out of the conveyer at this opening by centrifugal force, the door 22 being open at this time, while the doors 17 and 19 are closed. Thus it is seen that articles placed into the conveyer at an upper floor start on their journey at slow speed, which speed is soon increased and continues so until just before the articles reach their destination, whereupon they are automatically reduced in speed and finally are deposited at the desired floor landing gently and without danger of breakage. In moderately high buildings the conveyer spiral would preferably have a comparatively steep pitch until just before the lowest outlet or discharge opening is reached, at which point the spiral may be reduced in pitch and continues at this reduced pitch until the lowest outlet is reached. A spiral conveyer constructed after this manner will allow articles to descend from an upper floor at high speed until just before the lowest outlet is reached, when the speed of descending articles is retarded and the same slide gently out of the conveyer.

In the case of a building having a considerable number of floors connected by the conveyer, it is found desirable to decrease the speed of descending articles at some point or points intermediate the extreme upper and lower floors, rather than waiting until just before the lowest outlet is reached. In this way the speed of descent never becomes too great at any point in the conveyer. While this feature of decreasing the speed of descending articles just before they reach any desired discharge outlet is very desirable, it is equally desirable to so arrange the spiral in regard to its pitch that the speed of descending articles be reduced prior to their passage by any particular inlet opening, since it is readily seen that it would not be advisable to introduce articles onto the conveyer spiral at any intermediate inlet opening while other articles are passing at high speed adjacent thereto.

While the openings 14, 16, 18, 21 and 23 may be used for either discharging articles out of the conveyer or for inserting articles into the conveyer, I sometimes use separate outlet and inlet openings at each floor, the latter being arranged somewhat above the spiral conveying surface in order that descending articles will pass by the inlet opening and not be discharged therethrough.

By using separate inlet and outlet openings at any floor, it is possible to insert articles into the conveyer at that floor for delivery at some floor lower down while articles are being received at that floor from some floor above.

While I have described my invention in connection with a spiral gravity conveyer arranged to suit a building of five floors and a basement, the same may be arranged to suit a building of any desired number of floors. The pitch of the spiral conveying surface may be varied at any desired place or places to suit various conditions met with in practice.

It is obvious that various modifications in the construction shown could readily be made by those skilled in the art without departing from the spirit and scope of my invention, and for this reason I do not desire to be limited to the precise construction and arrangement of parts herein shown and described.

What I claim as new and desire to have protected by Letters Patent of the United States is:—

1. A gravity conveyer having a spiral conveying surface with the pitch of an intermediate portion less than that of the adjoining convolutions.

2. In a gravity conveyer, the combination of a casing provided with a plurality of openings, and a spiral blade within the casing and having the portions adjacent the openings uniformly located with respect to the openings and said blade having a variable number of convolutions between adjacent openings.

3. In a gravity conveyer, the combination of a casing provided with a plurality of openings in vertical alinement and a spiral blade extending through the casing, the pitch of different portions of the blade being varied to include a variable number of convolutions between adjacent openings, said openings being uniformly located with respect to the adjacent portions of the blade.

4. The combination with a plurality of floors, of a tubular casing extending through openings in the floors, and a spiral within the casing arranged to intersect the planes of the floors at points in substantially vertical alinement, said spiral having a variable number of convolutions between adjacent floors.

In testimony whereof, I have signed my name to this specification in the presence of two subscribing witnesses.

MARTIN C. SCHWAB.

Witnesses:
  CARL P. SCHROEDER,
  THEODORE VLADIMIROFF.